United States Patent
Lee

(10) Patent No.: US 10,679,377 B2
(45) Date of Patent: Jun. 9, 2020

(54) OBJECT DETECTION SYSTEM AND METHOD, AND COMPUTER READABLE RECORDING MEDIUM

(71) Applicant: Hanwha Techwin Co., Ltd., Seongnam-si (KR)

(72) Inventor: Young Hyun Lee, Changwon-si (KR)

(73) Assignee: Hanwha Techwin Co., Ltd., Changwon-si ( * ) Notice: Subject to any disclaimer, the term of this patent is extended or adjusted under 35 U.S.C. 154(b) by 263 days.

(21) Appl. No.: 15/675,400

(22) Filed: Aug. 11, 2017

(65) Prior Publication Data

US 2018/0322652 A1   Nov. 8, 2018

(30) Foreign Application Priority Data

May 4, 2017   (KR) .................. 10-2017-0056912

(51) Int. Cl.
*G06K 9/00* (2006.01)
*G06T 7/73* (2017.01)

(52) U.S. Cl.
CPC ................ *G06T 7/73* (2017.01); *G06T 7/74* (2017.01); *G06T 2207/10004* (2013.01); *G06T 2207/10016* (2013.01); *G06T 2207/10024* (2013.01); *G06T 2207/20081* (2013.01); *G06T 2207/30196* (2013.01); *G06T 2207/30232* (2013.01)

(58) Field of Classification Search
CPC . G06T 2207/10004; G06T 2207/10016; G06T 2207/10024; G06T 2207/20081; G06T 2207/30196; G06T 2207/30232; G06T 7/73; G06T 7/74
See application file for complete search history.

(56) References Cited

U.S. PATENT DOCUMENTS

| 2006/0098844 | A1  | 5/2006  | Luo |
| 2009/0244291 | A1  | 10/2009 | Saptharishi et al. |
| 2015/0015704 | A1* | 1/2015  | Hirasawa ................ G06T 7/292 |
|              |     |         | 348/143 |

(Continued)

FOREIGN PATENT DOCUMENTS

| KR | 10-0915773     | 9/2009 |
| KR | 10-2011-0002338 | 1/2011 |

(Continued)

*Primary Examiner* — Xin Jia
(74) *Attorney, Agent, or Firm* — H.C. Park & Associates, PLC

(57) ABSTRACT

An object detection system includes: a false detection storer to store one or more items of false detection information; an object detector to detect an object from an input image, compare object detection information corresponding to the object with the false detection information, and output a notification corresponding to the object detection information when false detection information corresponding to the object detection information does not exist; and a feedback receiver to receive a user response to the notification and, when a detection error response to the notification is received, store the object detection information corresponding to the notification as false detection information in the false detection storing unit, wherein the object detector does not output the notification when the object corresponding to the false detection information stored in the false detection storer is detected.

20 Claims, 11 Drawing Sheets

(56) References Cited

U.S. PATENT DOCUMENTS

2015/0213624 A1\* 7/2015 Lee .................... G06T 7/194
382/103

FOREIGN PATENT DOCUMENTS

| KR | 10-1600617 | 3/2016 |
| KR | 10-1607224 | 3/2016 |
| KR | 10-2016-0109885 | 9/2016 |
| KR | 10-2016-0125803 | 11/2016 |

\* cited by examiner

FIG. 7A

| NUMBER | COORDINATE INFORMATION | FIRST STORAGE TIME | LATEST UPDATE TIME | IMAGE INFORMATION |
|---|---|---|---|---|
| 1 | [20, 30, 80, 160] | 2017-01-01 05:48:34 | 2017-01-02 17:21:01 | CQDGQ |
| 2 | [70, 180, 40, 80] | 2017-01-01 05:48:34 | 2017-01-01 05:48:34 | DEGDQ |
| 3 | [50, 50, 30, 60] | 2017-01-03 13:20:00 | 2017-01-03 13:20:20 | DAQDG |
| 4 | [210, 50, 50, 100] | 2017-01-03 13:20:00 | 2017-01-03 13:20:20 | DBWQB |
| 5 | [20, 30, 70, 140] | 2017-01-03 13:20:00 | 2017-01-03 13:20:20 | GQDGQ |
| ... | ... | ... | ... | ... |

FIG. 7B

| NUMBER | COORDINATE INFORMATION | FIRST STORAGE TIME | LATEST UPDATE TIME | IMAGE INFORMATION | ... |
|---|---|---|---|---|---|
| 1 | [20, 30, 70, 140] | 2017-01-01 05:48:34 | 2017-01-03 13:20:20 | GQDGQ | ... |
| 2 | [50, 50, 30, 60] | 2017-01-03 13:20:00 | 2017-01-03 13:20:20 | DAQDG | ... |
| 3 | [210, 50, 50, 100] | 2017-01-03 13:20:00 | 2017-01-03 13:20:00 | DBWQB | ... |
| 4 | [70, 180, 40, 80] | 2017-01-01 05:48:34 | 2017-01-01 05:48:34 | DEGDQ | ... |
| ... | ... | ... | ... | ... | ... |

OBJECT DETECTION SYSTEM AND METHOD, AND COMPUTER READABLE RECORDING MEDIUM

CROSS-REFERENCE TO RELATED APPLICATION

This application claims the benefit of Korean Patent Application No. 10-2017-0056912, filed on May 4, 2017, in the Korean Intellectual Property Office, the disclosure of which is incorporated herein in its entirety by reference.

BACKGROUND

Field

The invention relates generally to an object detection system and method, and more particularly, to an object detection system and method that provides an accurate detection result to a user by storing a false detection result and continuously performing an update process.

Discussion of the Background

As the demand for and the interest in security and crime prevention have increased, closed-circuit television (CCTV) cameras have been increasingly deployed. Crimes may be prevented by installing CCTV cameras for performing necessary functions in areas to be monitored, capturing images of the areas, and making observations in real time.

Also, what happened in the monitored areas might be observed through recorded images.

Recently, residential CCTV cameras as well as CCTV cameras for security and crime prevention have been increasingly used for various purposes such as security, entertainment, and communication.

Object detection in a captured image is one of the essential technologies of various solution systems using CCTV cameras. Accordingly, there has been much interest in actively developing technologies for rapidly and accurately detecting an object in a captured image.

SUMMARY

Methods and apparatus constructed according to the principles of the invention provide detect an object in an image more accurately, and/or enable the system to self-correct the detection result without significant human intervention.

Additional aspects will be set forth in part in the description which follows and, in part, will be apparent from the description, or may be learned by practice of the disclosed embodiments.

According to one aspect of the invention, an object detection system includes: a false detection storer to store one or more items of false detection information; an object detector to detect an object from an input image, compare object detection information corresponding to the object with the items of false detection information, and output a notification corresponding to the object detection information when false detection information corresponding to the object detection information does not exist; and a feedback receiver configured to receive a user response to the notification and, when a detection error response to the notification is received, store the object detection information corresponding to the notification as false detection information in the false detection storer, wherein the object detector does not output the notification when the object corresponding to the false detection information stored in the false detection storer is detected.

The object detection information may include coordinate information corresponding to a location of the object and image information of pixels corresponding to the object, the false detection information may include coordinate information corresponding to a location of the object and image information of pixels corresponding to the object.

When comparing the object detection information corresponding to the detected object with the items of false detection information stored in the false detection storer and it is determined that the object detection information and any of the items of false detection information are similar to each other, the object detector may determine a location similarity between the coordinate information of the object detection information and coordinate information of the false detection information, and when the location similarity is equal to or greater than a preset value, the object detector may determine an image similarity between the image information of the object detection information and image information of the false detection information, and when the image similarity is equal to or greater than a preset value, the object detector may not output the notification.

When the coordinate information and the image information of the false detection information are determined to be similar to the coordinate information and the image information of the object detection information, the object detector may update the coordinate information and the image information of the false detection information to the coordinate information and the image information of the object detection information.

Each of the object detection information and the false detection information may further include time information about when the object is detected, and wherein the object detector compares the time information of the object detection information of the detected object with the time information of the false detection information to determine whether to output the notification.

The false detection storer may delete false detection information that is not updated for a preset period of time from the items of false detection information that are stored in the false detection storer.

The object detection system may further include a display unit configured to display the object detected by the object detector for a preset period of time, and wherein the feedback receiver receives the user response to the displayed object.

The input image may be a background image that does not include an object to be detected.

The false detection storer may include a false detection unit, the object detector may include an object detecting unit, the feedback receiver may include a feedback receiving unit, the displayer may include a display unit.

The input image may be obtained by an imaging apparatus installed at a fixed position.

According to another aspect of the invention, an object detection method includes: detecting an object from an input image; comparing object detection information corresponding to the detected object with one or more items of false detection information stored in a memory; outputting a notification corresponding to the object detection information when false detection information corresponding to the object detection information does not exist; receiving a user response to the notification; and when a detection error response to the notification is received, storing the object detection information corresponding to the notification as false detection information in the memory, wherein when the false detection information corresponding to the object detection information of the detected object is stored in the memory, the notification is not output.

The object detection information may include coordinate information corresponding to a location of the object and image information of pixels corresponding to the object, the false detection information may include coordinate information corresponding to a location of the object and image information of pixels corresponding to the object.

The comparing step may include determining a location similarity between the coordinate information of the object detection information and coordinate information of the false detection information, and when the location similarity is equal to or greater than a preset value, determining an image similarity between the image information of the object detection information and image information of the false detection information, and when the image similarity is equal to or greater than a preset value, not outputting the notification.

When the coordinate information and the image information of the false detection information are determined to be similar to the coordinate information and the image information of the object detection information, the object detection method may further include the step of updating the coordinate information and the image information of the false detection information to the coordinate information and the image information of the object detection information.

Each of the object detection information and the false detection information may further include time information at which the object is detected, wherein the comparing step includes comparing the time information of the object detection information of the detected object with the time information of items of the false detection information.

The object detection method may further include the step of deleting false detection information that is not updated for a preset period of time from items of the false detection information stored in the memory.

The object detection method may further include the step of displaying the object detected in the detecting for a preset period of time, wherein the receiving step includes receiving the user response concerning the displayed object.

The input image may not include an object to be detected.

The input image may be generated by an imaging apparatus installed at a fixed position.

According to yet another aspect of the invention, an object detection system comprising: at least one processor configured to execute computer-readable instructions, wherein the at least one processor is configured to: store one or more items of false detection information; detect an object from an input image, compare object detection information corresponding to the object with the false detection information, and output a notification corresponding to the object detection information when false detection information corresponding to the object detection information does not exist; receive a user response to the notification and, when a detection error response to the notification is received, store the object detection information corresponding to the notification as false detection information, and not output the notification when the object corresponding to the false detection information is detected.

BRIEF DESCRIPTION OF THE DRAWINGS

These aspects will become apparent and more readily appreciated from the following description of the embodiments, taken in conjunction with the accompanying drawings in which:

FIG. 7A and FIG. 7B are exemplary diagrams for explaining a process of updating false detection information stored in a false detection storing unit;

DETAILED DESCRIPTION OF THE ILLUSTRATED EMBODIMENTS

Figure 1:
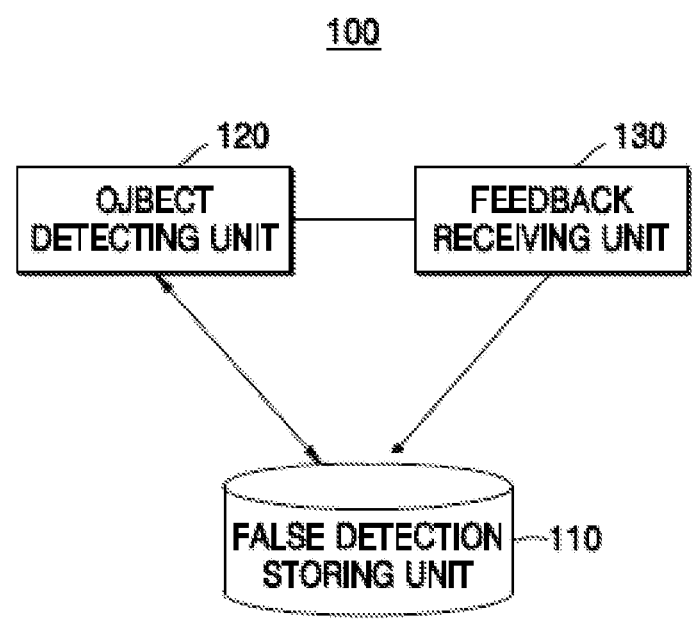
FIG. 1 is a block diagram illustrating a configuration of a first embodiment of an object detection system constructed according to the principles of the invention.

Reference will now be made in detail to embodiments, examples of which are illustrated in the accompanying drawings. In the drawings, the same elements are denoted by the same reference numerals and a repeated explanation thereof will not be given.

The terminology used herein is for the purpose of describing embodiments only and is not intended to be limiting of embodiments. As used herein, the singular forms "a", "an", and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. It will be understood that, although the terms first, second, etc. may be used herein to describe various elements, these elements should not be limited by these terms. These terms are only used to distinguish one element from another.

FIG. 1 is a block diagram illustrating a configuration of a first embodiment of an object detection system constructed according to the principles of the invention. Referring to FIG. 1, the object detection system 100 according to an exemplary embodiment includes a false detection storing unit 110, an object detecting unit 120, and a feedback receiving unit 130. The false detection storing unit 110 stores one or more items of false detection information as one or more image blocks or other image data. The term "false detection information" refers to information about an object that is falsely detected by the object detecting unit 120. For example, an object falsely detected may indicate that an object that was supposed to be detected was not detected, or an object that was not supposed to be detected was detected.

The object detecting unit 120 detects an object from an input image, compares object detection information corresponding to the object with the one or more items of false detection information, and outputs a notification corresponding to the object detection information when the false detection information corresponding to the object detection information does not exist.

In exemplary embodiments, false detection storing unit, object detecting unit, feedback receiving unit and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, false detection storing unit, object detecting unit, feedback receiving unit and/or one or more components thereof may include or otherwise be associated with one or more memories (not shown) including code (e.g., instructions) configured to cause false detection storing unit, object detecting unit, feedback receiving unit and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

The input image may be obtained from an imaging apparatus that is installed at a fixed position. For example, the imaging apparatus may be installed at a position suitable to image a place where an intruder may enter and exit such as a porch or a balcony of a house.

Also, the object detecting unit 120 may detect an object in the input image, the object may be a person or an animal, and an object to be detected by the object detecting unit 120 may be set to vary according to a user's needs.

The object detecting unit 120 may detect an object in the input image by using any of various methods known in the art. For example, the object detecting unit 120 may use a method involving learning a background image and detecting an object in a difference image between the background image and an image that is currently input. In another exemplary embodiment, the object detecting unit 120 may use a method involving generating a classifier by using a Haar-like feature point and detecting an object in an input image.

The method used by the object detecting unit 120 to detect an object is not limited thereto, and any method that may distinguish an object to be detected in an image input from the imaging apparatus may be used.

The object detecting unit 120 may compare the object detection information corresponding to the detected object with the false detection information stored in the false detection storing unit 110 and, when the false detection information corresponds to the object detection information, unit 110 may determine a similarity between the false detection information and the object detection information. For example, it may be determined that as the increases, the object detection information and the false detection information are more similar to each other and the detected object is not appropriately detected.

When the similarity is high, the confidence level in a detection result is low. Accordingly, in this case, the object detection information corresponding to the detected object is stored as false detection information in the false detection storing unit 110.

In contrast, when the similarity between the object detection information and the false detection information is low or when false detection information corresponding to the object detection information does not exist, the object detecting unit 120 outputs a notification indicating that the object is detected.

The feedback receiving unit 130 receives a user response to the notification, and when receiving a detection error response to the notification, stores the object detection information corresponding to the notification in the false detection storing unit 110.

Once the notification is output by the object detecting unit 120, the user may directly check whether the object has been detected, and according to the results of the check, may input a detection error response or may not take any action. In this case, when the feedback receiving unit 130 receives the detection error response to the notification, the feedback receiving unit 130 determines that the notification is output due to false object detection and stores the object detection information in the false detection storing unit 110. Since the object detection information is stored according to a false detection result in this case, the object detection information is stored as false detection information. Accordingly, the items of false detection information stored in the false detection storing unit 110 may be generated as a detection result of the object detecting unit 120 and the user's response to the detection result.

The object detection information and the false detection information may indicate characteristics of an object, and in particular, the false detection information may indicate characteristics of an object that is falsely detected.

The notification may provide an interface for receiving a feedback of an object detection result from the user. For example, a figure or a button for inputting a feedback such as an error or a normal state for the object detection information may be displayed and the user may be encouraged to input a feedback on the object detection result.

Figure 2:
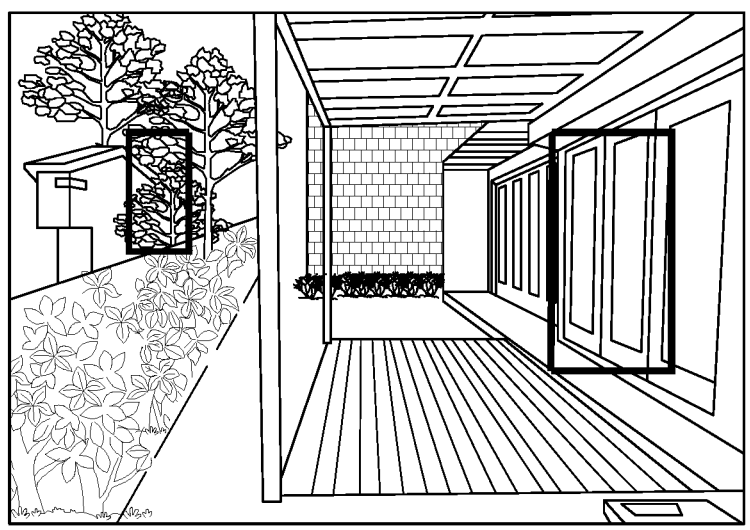
FIG. 2 is a view illustrating an exemplary false object detection result.

FIG. 2 is a view illustrating an exemplary false object detection result.

FIG. 2 illustrates an exemplary object detection result of the object detecting unit 120 of FIG. 1 indicating that an object exists in a rectangular region.

Referring to FIG. 2, since no object actually exists in the rectangular region, it is determined that there is an error in a detection result of the object detecting unit 120. When a response to the detection result is received from the user, the feedback receiving unit 130 may store information corresponding to the rectangular region, that is, object detection information, as false detection information in the false detection storing unit 110.

The object detection information may include coordinate information corresponding to the location of an object detected by the object detecting unit 120 and image information of pixels corresponding to the object. For example, in FIG. 2, coordinate information stored in the false detection storing unit 110 may include coordinate information corresponding to vertices of the rectangular region and information about a size of the rectangular region.

Image information corresponding to the rectangular region may be stored along with the coordinate information in the false detection storing unit 110, and the image information may include image information of pixels corresponding to the detected object.

In another exemplary embodiment, the object detecting unit 120 may detect and display an object in an input image obtained for a preset period of time, and the feedback receiving unit 130 may receive a user response to the object detected for the preset period of time.

For example, a screen of FIG. 2 may be a screen on which an object detected from the input image obtained for the preset period of time is displayed. After the object detection system 100 is installed in a house or an office, the user may check whether the object detection system 100 normally operates and may cause the object detection system 100 to detect an object for a predetermined period of time in order to store a false detection result.

When the object detected for the predetermined period of time is displayed, the feedback receiving unit 130 may receive a response to an object detection result from the user and may store false detection information corresponding to the response of the user in the false detection storing unit 110.

In this case, the input image may not include an object to be detected. For example, assuming that the object to be detected has been set to detect a person, the input image does not include a person, and when an object is detected by the object detecting unit 120, the object detection result may be determined to be a false detection and object detection information corresponding to the false detection may be stored as false detection information in the false detection storing unit 110.

Figure 3:
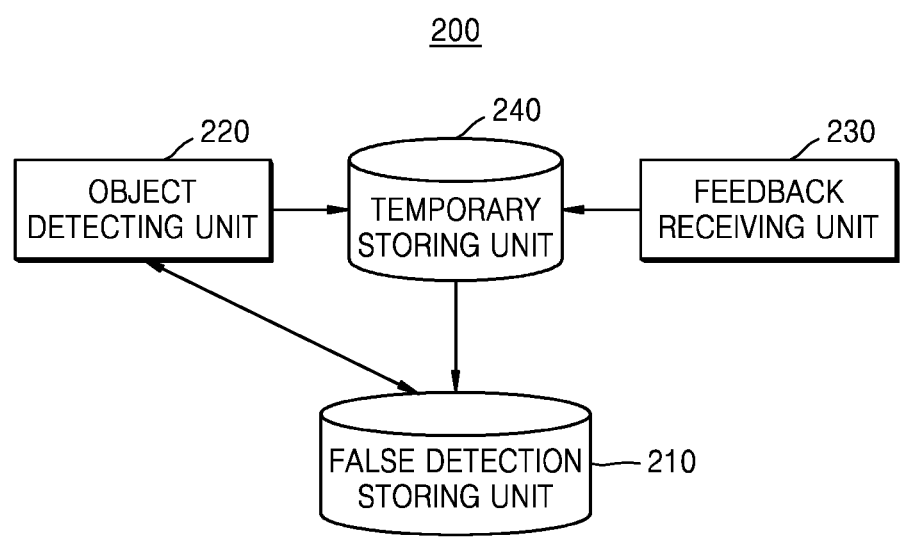
FIG. 3 is a block diagram illustrating a configuration of a second embodiment of an object detection system constructed according to the principles of the invention.

FIG. 3 is a block diagram illustrating a configuration of a second embodiment of an object detection system 200 constructed according to the principles of the invention.

Referring to FIG. 3, the object detection system 200 according to another exemplary embodiment includes a false detection storing unit 210, an object detecting unit 220, a feedback receiving unit 230, and a temporary storing unit 240.

The temporary storing unit 240 stores object detection information corresponding to an object detected by the objet detecting unit 220. The temporary storing unit 240 temporarily stores the object detection information before receiving a feedback on a detection result from the user.

When the feedback receiving unit 230 receives a response corresponding to false detection, the object detection information is stored as false detection information in the false detection storing unit 210. When the feedback receiving unit 230 receives a response corresponding to normal detection, the object detection information may be deleted from the temporary storing unit 240.

Figure 4:
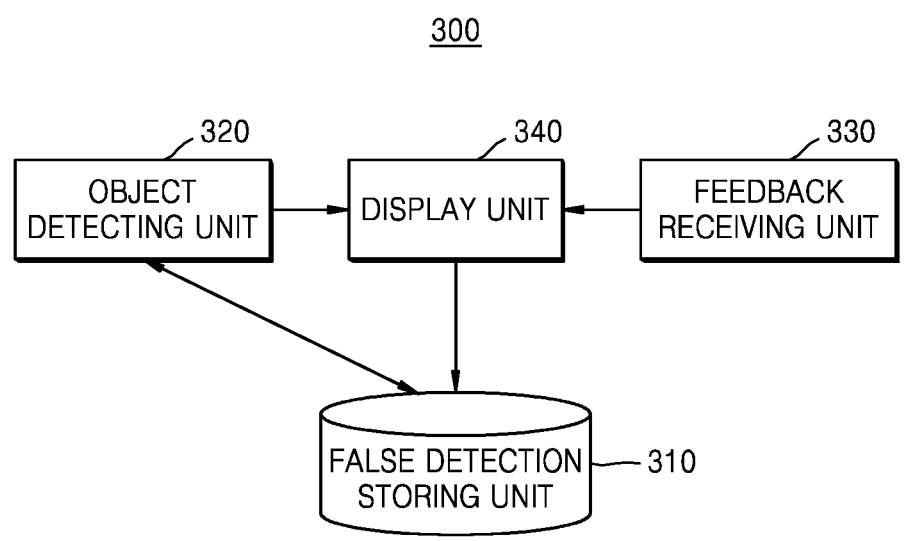
FIG. 4 is a block diagram illustrating a configuration of a third embodiment of an object detection system constructed according to the principles of the invention.

FIG. 4 is a block diagram illustrating a configuration of a third embodiment of an object detection system 300 constructed according to the principles of the invention.

Referring to FIG. 4, the object detection system 300 according to another exemplary embodiment includes a false detection storing unit 310, an object detecting unit 320, a feedback receiving unit 330, and a display unit 340.

The display unit 340 displays an object detected by the object detecting unit 320. In this case, the display unit 340 may include a display device, and the user may check an object detection result displayed on the display device and may input a user's response.

Also, the display unit 340 may display an object detected by the object detecting unit 320 from an input image obtained for a preset period of time as described with reference to FIG. 2. Also, the display unit 340 may display an interface provided by the feedback receiving unit 330 and may encourage the user to input a user's response.

Figure 5A:
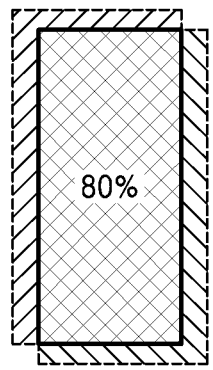
FIG. 5A and FIG. 5B are schematic views for explaining a process of comparing coordinate information of a detected object with coordinate information of false detection information that is stored in a false detection storing unit.
Figure 5B:
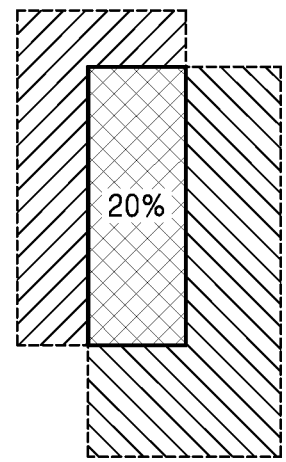

FIGS. 5A and 5B are views for explaining a process of comparing coordinate information of a detected object with coordinate information of false detection information that is stored in the false detection storing unit 110.

Referring to FIGS. 5A and 5B, two regions that overlap each other refer to coordinate information included in false detection information stored in the false detection storing unit 110 and coordinate information included in object detection information of an object detected by the object detecting unit 120.

The object detecting unit 120 may compare the object detection information corresponding to the detected object with one or more items of false detection information stored in the false detection storing unit 110, and when it is determined that the object detection information and any of the items of false detection information are similar to each other, may store the object detection information as false detection information in the false detection storing unit 110 without outputting a notification.

In this case, the object detecting unit 120 may determine a location similarity between coordinate information of the object detection information and coordinate information of the false detection information stored in the false detection storing unit 110. When the location similarity is equal to or greater than a preset value, for example, a first reference value, the object detecting unit 120 may determine an image similarity between image information of the object and image information included in the false detection information.

FIGS. 5A and 5B illustrate an exemplary process of determining a location similarity between coordinate information of the false detection information and coordinate information of the object detection information. Referring to FIG. 5A, the coordinate information of the false detection information and the coordinate information of the object detection information have a location similarity of 80%, and referring to FIG. 5B, the coordinate information of the false detection information and the coordinate information of the object detection information have a location similarity of 20%.

When the first reference value is set to 80%, it may be determined that the coordinate information of the false detection information and the coordinate information of the object detection information in FIG. 5A are similar to each other, and the object detecting unit 120 may determine a similarity of image information between the false detection information and the object detection information.

A plurality of items of false detection information corresponding to objects having different characteristics may be stored in the false detection storing unit 110. The object detecting unit 120 may determine a similarity of image information when false detection information including coordinate information whose location similarity to coordinate information included in the object detection information is equal to or greater than the first reference value exists in the plurality of items of false detection information stored in the false detection storing unit 110.

In FIG. 5B, when the first reference value is set to 20%, it may be determined that the coordinate information of the false detection information and the coordinate information of the object detection information in FIG. 5B are not similar to each other. When the coordinate information of the false detection information and the coordinate information of the object detection information are not similar to each other, the object detecting unit 120 may not determine a similarity of image information between the false detection information and the object detection information and may output a notification. That is, in FIG. 5B, since false detection information corresponding to the object detected by the object detecting unit 120 is not stored in the false detection storing unit 110, the object detecting unit 120 may output a notification in order to receive a feedback from the user.

Although the object detecting unit 120 determines an image similarity after determining a location similarity, exemplary embodiments are not limited thereto, and the object detecting unit 120 may determine whether false detection information including image information that is similar to image information of the detected object exists and then may determine a location similarity.

Figure 6:
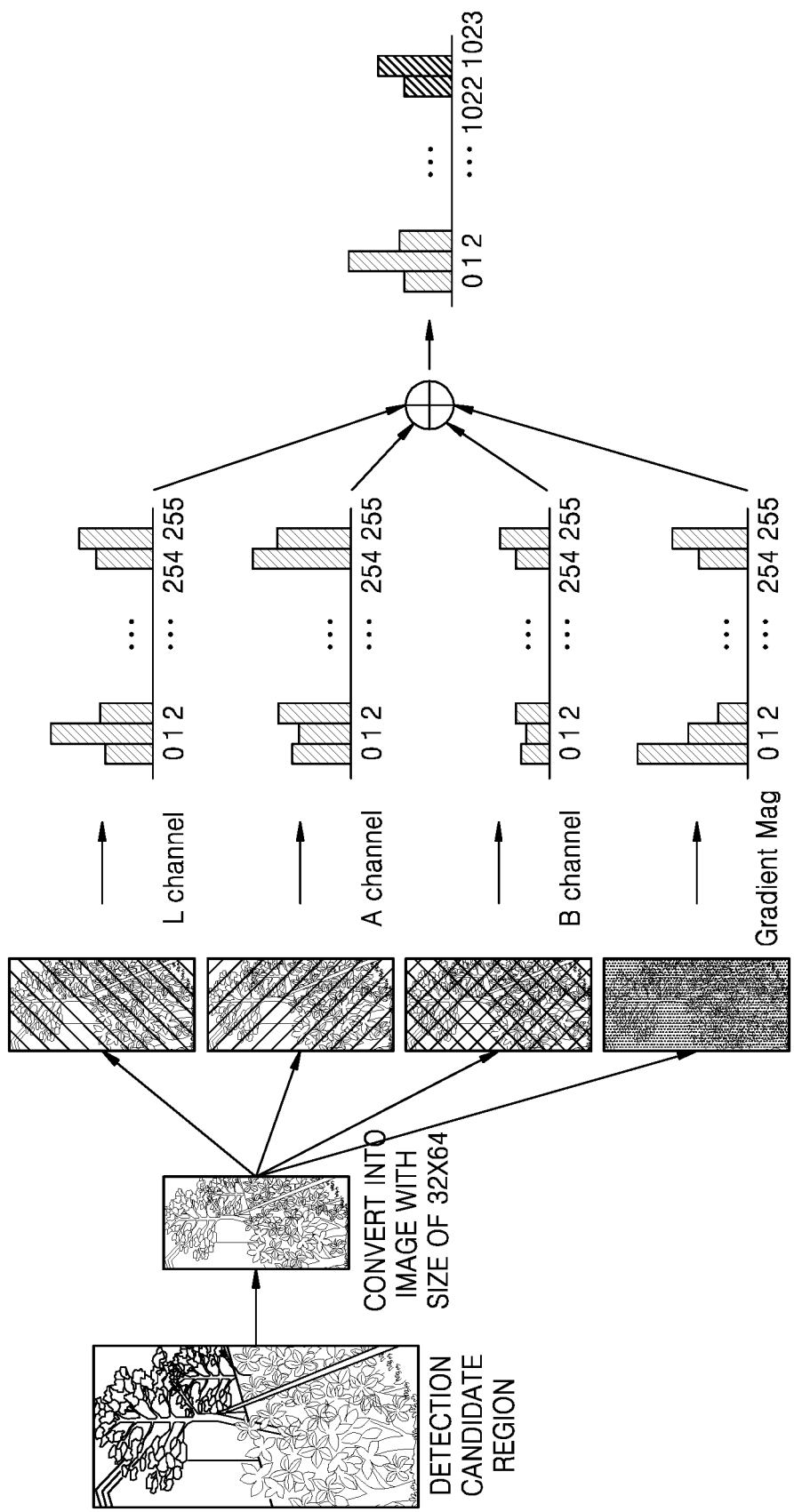
FIG. 6 is a diagram for explaining a method of generating image information of a detected object according to the principles of the invention.

FIG. 6 is a diagram for explaining a method of generating image information of a detected object according to the principles of the invention.

First, the object detecting unit 120 sets a region where an object is detected as a detection candidate region, extracts an image corresponding to the detection candidate region, and converts the image into a normalized image. In FIG. 6, it is assumed that a size of a normalized image is 32×64, and an image is converted into a normalized image having a size of 32×64 irrespective of a size of the detection candidate region where an object is first detected.

The object detecting unit 120 converts the normalized image from an RGB color space into an LAB color space. The object detecting unit 120 may obtain a gradient magnitude (GM) in each of the channels (i.e., an L channel, an A channel, and a B channel) of the LAB color space, may select a large magnitude value at each pixel position, and may generate one GM image. In this exemplary process, the object detecting unit 120 may extract four images corresponding to the L channel, the A channel, the B channel, and a GM channel, and a pixel value of each of the four images may be a 8-bit value ranging from 0 to 255.

Next, the object detecting unit 120 may generate a histogram in each channel. A histogram of each channel image has a frequency sum of 32×64=2048 and an x-axis range from 0 to 255. Last, the object detecting unit 120 may connect the four histograms and may generate a histogram having a frequency sum of 2048×4=8192 and an x-axis range from 0 to 1023.

The x-axis of the histogram that is finally generated in FIG. 6 may represent a dimension of a vector and the y-axis of the histogram may represent a vector value of the dimension, and as a result, a vector of 1024 dimensions may be extracted from one detection candidate region image.

The object detecting unit 120 determines a location similarity between coordinate information included in object detection information of the detection candidate region and coordinate information of false detection information stored in the false detection storing unit 110 and determines an image similarity when the location similarity is equal to or greater than a preset value, as described with reference to FIGS. 5A and 5B.

The image similarity refers to a similarity between image information included in the object detection information of the detection candidate region and image information of the false detection information stored in the false detection storing unit 110. When both the location similarity and the image information are equal to or greater than preset values, it may be determined that the object existing in the detection candidate region is falsely detected as described with reference to FIGS. 5A and 5B. Accordingly, in this case, a notification about the detection candidate region (or the object existing in the detection candidate region) is not output.

The image similarity may be calculated by using weighted hamming distance (WHD) information. A hamming distance (HD) may be obtained by using a method of obtaining an absolute value of a difference of a vector value in the same dimension between two vectors and adding the absolute value of the difference for all dimensions.

A WHD is obtained by applying a weight to the HD. A weight may be applied to each of the L channel, the A channel, the B channel, and the GM channel, and a sum of the weights applied to the L, A, B, and GM channels may be 1.

When the WHD between the two vectors decreases, the two vectors are more similar to each other. Accordingly, when a reference value of the WHD is set and the WHD between the two vectors is less than the reference value, it may be determined that the two vectors are similar to each other.

The two vectors may respectively correspond to image information of pixels corresponding to the object detected by the object detecting unit 120 and image information included in the false detection information stored in the false detection storing unit 110.

FIGS. 7A and 7B are diagrams for explaining a process of updating false detection information stored in a false detection storing unit.

As described with reference to FIG. 1, the false detection storing unit 110 may store object detection information of an object that is falsely detected as false detection information, and the false detection information may include coordinate information and image information. The coordinate information refers to information about a location of the object detected by the object detecting unit 120, and the image information refers to image information of pixels corresponding to the object. The image information of FIGS. 7A and 7B may be obtained by the coding of vectors of FIG. 6.

Referring to FIGS. 7A and 7B, the coordinate information may be coordinates of vertices of a region (e.g., a rectangular region) corresponding to the object that is falsely detected.

In FIG. 7A, false detection information that is stored later is stored in a place with a larger row number or with a lower priority. Each false detection information may further include time information about the time at which an object corresponding to the false detection information is detected.

A first storage time and a latest update time of FIGS. 7A and 7B correspond to the time information.

FIG. 7A illustrates items of false detection information of the false detection storing unit 110 before an update process is performed. Accordingly, the first storage time and the latest update time are the same, except for row number 1, because row number 1 has been updated more than once.

In FIG. 7A, false detection information of a row number 1 and false detection information of a row number 5 have similar coordinate information and image information, and thus may be determined to be similar to each other.

As shown in FIG. 7B, the false detection information of the original row number 1 of FIG. 7A is updated to the false detection information of the row number 5 of FIG. 7B. That is, when an object having object detection information that is similar to false detection information stored in the false detection storing unit 110 is detected by the object detecting unit 120, the false detection storing unit 110 may update existing false detection information to the object detection information that is obtained latest.

The object detecting unit 120 may compare the object detection information of the detected object with false detection information including time information corresponding to time information of the detected object from among items of false detection information stored in the false detection storing unit 110 and may determine whether to output a notification about the detected object.

For example, when the object detecting unit 120 operates during day time and detects an object, the object detecting unit 120 may compare object detection information of the object with false detection information corresponding to the object detected during the day time from among items of false detection information stored in the false detection storing unit 110. Accordingly, even when false detection information similar to the object detection information of the detected object exists in the false detection storing unit 110, if the false detection information stored in the false detection storing unit 110 corresponds to an object detected during night time, the object detecting unit 120 may determine that the false detection information and the object detection information are not similar to each other.

As shown in FIG. 7B, the false detection information of a row number 2 of FIG. 7A is updated to that of a row number 4 of FIG. 7B. The false detection storing unit 110 may align items of false detection information so that false detection information that is updated latest is located at an uppermost end based on a time at which false detection information is updated.

Also, the false detection storing unit 110 may delete false detection information that is not updated for a preset period of time from among the items of false detection information, thereby preventing a processing speed from decreasing due to data comparison.

Figure 8:
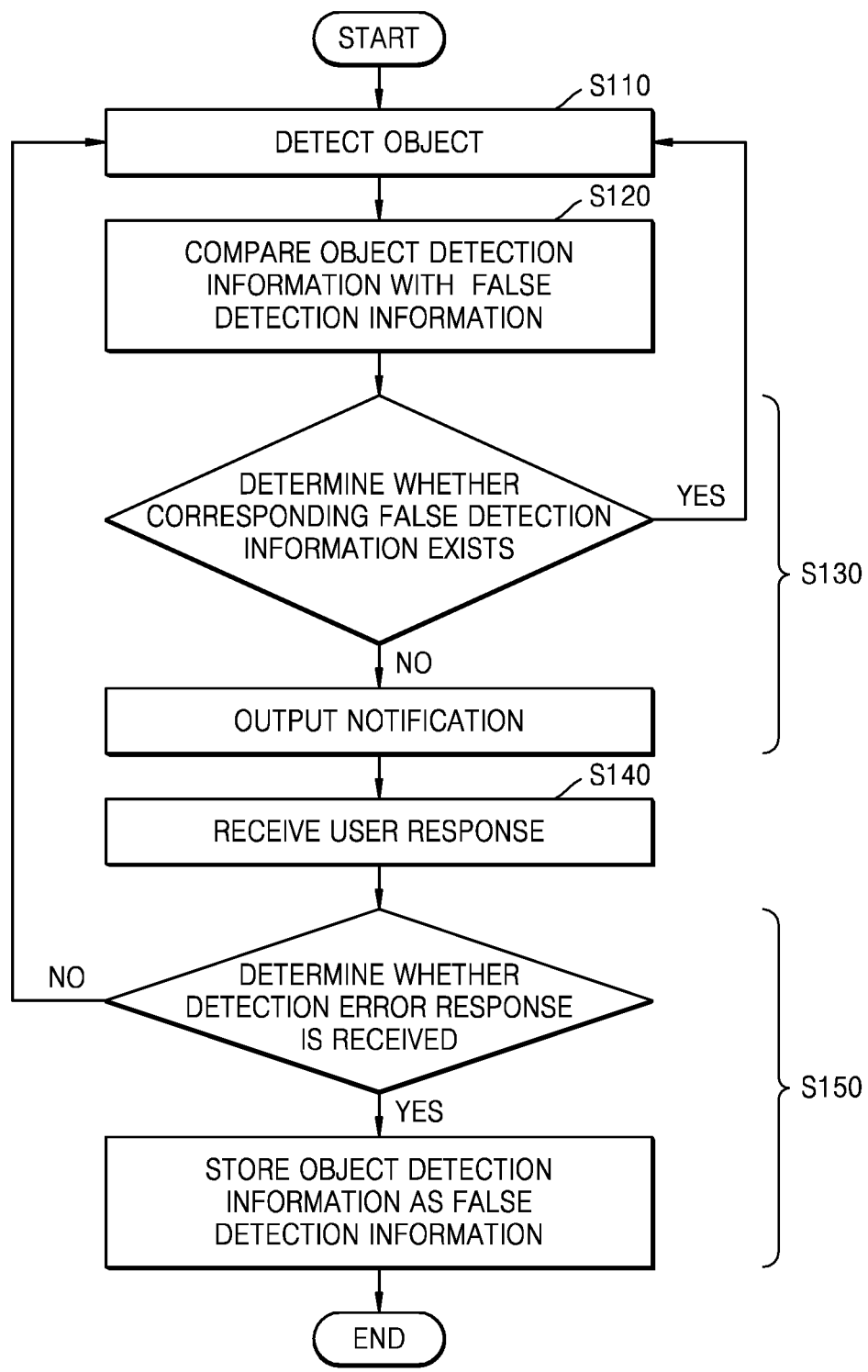
FIG. 8 is a flowchart of an exemplary object detection method according to the principles of the invention.

FIG. 8 is a flowchart of an exemplary object detection method according to the principles of the invention.

Referring to FIG. 8, the object detection method includes operation S110 in which an object is detected, operation S120 in which false detection information is compared, operation S130 in which a notification is output, operation S140 in which a user response is received, and operation S150 in which information is stored as false detection information.

In operation S110, an object is detected from an input image. The input image may be generated from any known imaging apparatus that is installed at a fixed position. For example, the imaging apparatus may be installed at a position suitable to image a place where an intruder may enter and exit such as a porch or a balcony of a house.

Also, the object detected in operation S110 may be a human or an animal, and an object to be detected may be set to vary according to a user's needs.

The object may be detected from the input image in operation S110 by using any of various known methods. For example, the object may be detected by using a method involving learning a background image and detecting an object through a difference image between the background image and an image that is currently input. In another exemplary embodiment, the object may be detected by using a method involving generating a classifier by using a Haar-like feature point and detecting an object in an input image.

The method used in operation S110 to detect the object is not limited thereto, and any method that may distinguish an object to be detected in an image input from the imaging apparatus may be used.

In operation S120, object detection information corresponding to the detected object and items of false detection information stored in a memory are compared with each other. When it is determined in operation S120 that false detection information corresponding to the object detection information corresponding to the detected object exists in the memory, a similarity between the object detection information corresponding to the detected object and the false detection information stored in the memory may be determined. It may be determined that as the similarity increases, the object detection information and the false detection information are more similar to each other and the detected object is not appropriately detected.

The false detection information stored in the memory may refer to information indicating characteristics of an object that is falsely detected, and when the similarity is low, the confidence level in a detection result may be high.

Each of the object detection information and the false detection information includes coordinate information corresponding to a location of the detected object and image information of pixels corresponding to the object. In operation S120, a location similarity between coordinate information of the object detection information and coordinate information of the false detection information may be determined, and when the location similarity is equal to or greater than a preset value, for example, a first reference value, an image similarity between image information of the object detection information and image information of the false detection information may be determined.

When the image similarity is equal to or greater than a preset value, for example, a second reference value, in operation S130, a notification is not output.

In operation S130, a notification corresponding to the object detection information is output when it is determined in operation S120 that the false detection information corresponding to the object detection information does not exist. That is, a notification is output when the items of false detection information are compared with the object detection information in operation S120, all of the items of false detection information have a low similarity to the object detection information, and thus false detection information corresponding to the object detection information is not found in the memory.

In this case, in operation S130, when it is determined that the object is detected in the input image, the notification is output. The notification may be output to notify the user that the object is detected and to receive a feedback on a detection result from the user.

Also, in operation S130, the detected object may be displayed on a display device. The detected object may be displayed on the input image as shown in FIG. 2, and the input image, the detected object, and the notification may be provided to the user through the display device.

When it is determined in operation S130 that false detection information corresponding to the object detection information of the detected object is stored in the memory, in operation S130, the notification is not output.

In operation S140, a user response to the notification is received. The user may directly check whether the object is detected by using the notification output in operation S130, and according to a checking result, may input a detection error response or may not take any action.

The notification output in operation S130 may provide an interface for receiving a feedback on an object detection result from the user. For example, a figure or a button for inputting a feedback such as an error or a normal state for the object detection information may be displayed and the user may be encouraged to input a feedback on an object detection result.

In operation S150, when the detection error response to the notification is received, the object detection information corresponding to the notification is stored as false detection information in the memory.

Since the detection error response means that the object detected in operation S110 is falsely detected, the object detection information of the detected object may also include error information. Accordingly, the object detection information is stored as false detection information.

The object detection method according to an exemplary embodiment may further include an operation of displaying the object detected in operation S110 for a preset period of time, and in operation S140, the user response to the displayed object may be received.

For example, a screen of FIG. 2 may be a screen on which the object detected from the input image obtained for the preset period of time is displayed. In the operation of the displaying, all objects detected for the preset period of time may be displayed, and in operation S140, a feedback on each of the displayed objects may be received from the user.

In this case, the input image may not include an object to be detected. For example, assuming that the object to be detected is set to a person, when the input image does not include a person and the object is detected in operation S110, an object detection result may be determined as false detection and object detection information corresponding to the object may be stored as false detection information in the memory.

Figure 9:
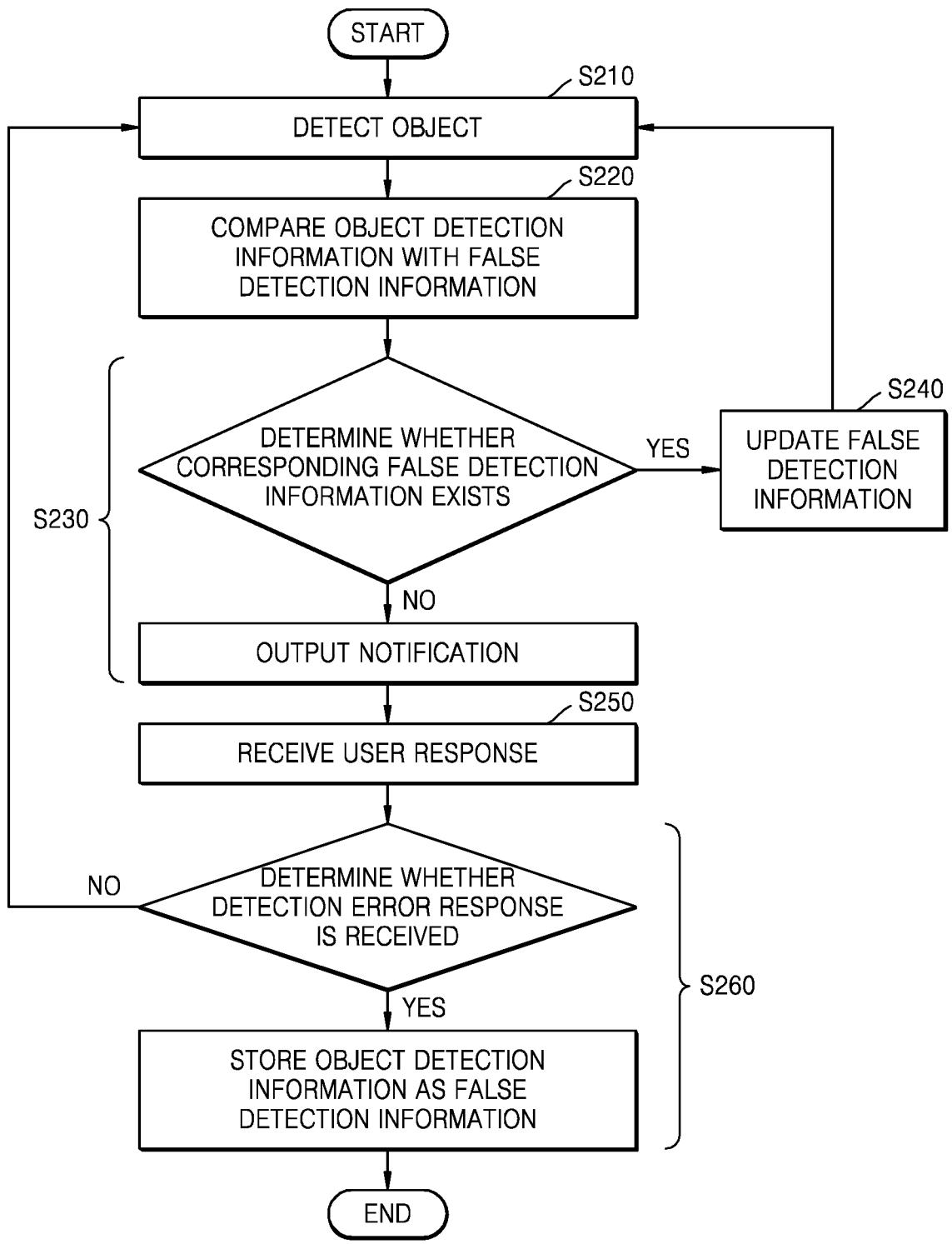
FIG. 9 and FIG. 10 are flowcharts of additional exemplary object detection methods according to the principles of the invention.
Figure 10:
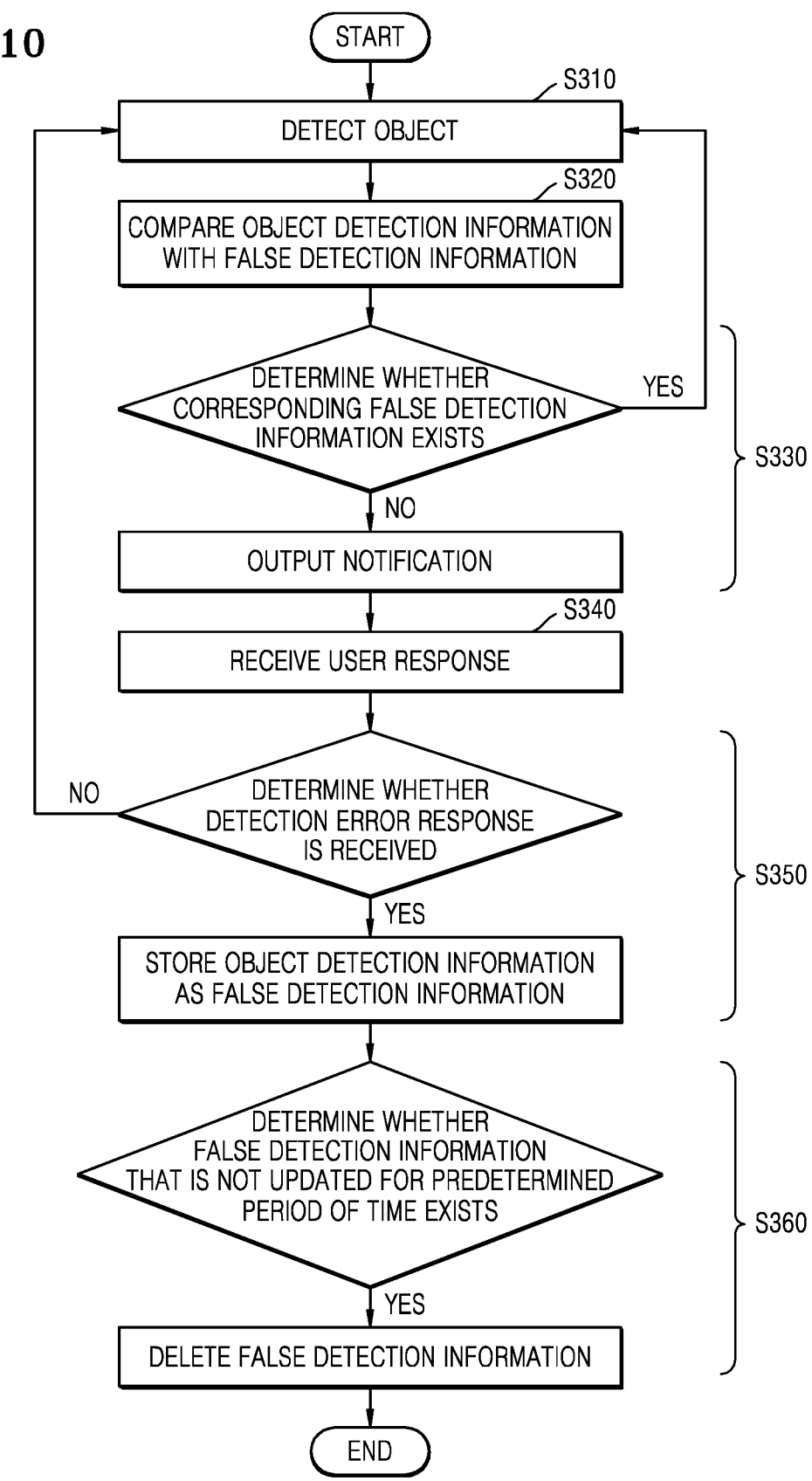

FIGS. 9 and 10 are flowcharts of additional exemplary object detection methods according to principles of the invention.

First, referring to FIG. 9, an object detection method according to another exemplary embodiment further includes operation S240 in which operation false detection information is updated.

In operation S240, false detection information stored in the memory is updated. As described with reference to FIG. 8, in operation S220, object detection information and items of false detection information are compared with each other. In this case, when it is determined that coordinate information and image information of the object detection information are similar to coordinate information and image information of any of the items of false detection information, the object detection method proceeds to operation S240. In operation S240, the coordinate information and the image information of the false detection information may be updated to the coordinate information and the image information of the object detection information.

Each of the object detection information and the false detection information may further include time information about the time at which an object is detected. In operation S220, the object detection information and false detection information including time information corresponding to time information of the detected object from among the items of false detection information stored in the memory are compared with each other.

For example, the object detection information of the object that is detected during day time may be compared with false detection information corresponding to the object that is detected during day time from among the items of false detection information stored in the memory to determine a similarity. Accordingly, even when coordinate information and image information of the object detection information are similar to coordinate information and image information of the false detection information, if time information of the object detection information does not correspond to time information of the false detection information, it may be determined that the object detection information and the false detection information are not similar to each other.

Referring to FIG. 10, an object detection method according to another exemplary embodiment further includes operation S360 in which false detection information is deleted. In operation S360, false detection information that is not updated for a preset period of time among items of false detection information that are stored in the memory is deleted.

As described with reference to FIG. 9, when an object including coordinate information and image information similar to coordinate information and image information included in false detection information stored in the memory is detected, existing false detection information may be updated to object detection information corresponding to the object.

As described with reference to FIG. 10, when the object is detected in operation S310, it is determined whether object detection information of the detected object is similar to any of items of false detection information stored in the memory in operation S320. As the number of items of false detection information stored in the memory increases, it takes more time to compare information.

Also, since when the object including coordinate information and image information similar to coordinate information and image information of any false detection information stored in the memory is not detected, the false detection information stored in the memory is not updated to new information, false detection information that is not updated for a predetermined period of time is unlikely to be used to determine whether to output a notification about the detected object.

Accordingly, in operation S360, false detection information that is not updated for the preset period of time may be deleted in order to increase processing speed.

As described herein, object detection system and methods constructed according to the principles of the invention may detect an object in an image and provide a more accurate detection result, with minimum user intervention, and/or increase the processing speed at which false detection determinations are made, thereby improving the operation of such systems and the user experience.

The principles of the invention can also be embodied as computer-readable codes on a computer-readable recording medium. The computer-readable recording medium is any data storage device that can store data which can thereafter be read by a computer system. Examples of the computer-readable recording medium include read-only memory (ROM), random-access memory (RAM), CD-ROMs, magnetic tapes, floppy disks, optical data storage devices, etc.

The computer-readable recording medium can also be distributed over network coupled computer systems so that the computer-readable code is stored and executed in a distributive manner. Also, functional programs, codes, and code segments for accomplishing the disclosure can be easily construed by programmers skilled in the art to which the disclosure pertains.

Also, the steps of all methods described herein can be performed in any suitable order unless otherwise indicated herein or otherwise clearly contradicted by context. This disclosure is not limited to the described order of the steps.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to one of ordinary skill in the art without departing from the spirit and scope of the disclosure. It will be understood by one of ordinary skill in the art that numerous modifications, adaptations, and changes will be made according to design conditions and factors without departing from the spirit and scope of the appended claims.

Accordingly it should be understood that the disclosure is not limited to these particular embodiments but also includes various modifications, equivalents, and/or alternatives thereof without departing from the scope of the disclosure.

What is claimed is:

1. An object detection system comprising:
a false detection storer to store one or more items of false detection information;
an object detector to detect an object from an input image, compare object detection information corresponding to the object with the false detection information, and output a notification corresponding to the object detection information when false detection information corresponding to the object detection information does not exist; and
a feedback receiver to receive a user response to the notification and, when a detection error response to the notification is received, store the object detection information corresponding to the notification as false detection information in the false detection storer,
wherein the object detector does not output the notification when the object corresponding to the false detection information stored in the false detection storer is detected.

2. The object detector of claim 1, wherein the object detection information comprises coordinate information corresponding to a location of the object and image information of pixels corresponding to the object; wherein the false detection information comprises coordinate information corresponding to a location of the object and image information of pixels corresponding to the object.

3. The object detection system of claim 2, wherein, when comparing the object detection information corresponding to the detected object with the false detection information stored in the false detection storer, the object detector determines a location similarity between the coordinate information of the object detection information and coordinate information of the false detection information, and when the location similarity is equal to or greater than a preset value, the object detector determines an image similarity between the image information of the object detection information and image information of the false detection information, and when the image similarity is equal to or greater than a preset value, the object detector does not output the notification.

4. The object detection system of claim 3, wherein, when the coordinate information and the image information of the false detection information are determined to be similar to the coordinate information and the image information of the object detection information, the object detector updates the coordinate information and the image information of the false detection information to the coordinate information and the image information of the object detection information.

5. The object detection system of claim 2, wherein each of the object detection information and the false detection information further comprises time information about when the object is detected, and
wherein the object detector compares the time information of the object detection information of the detected object with the time information of the false detection information to determine whether to output the notification.

6. The object detection system of claim 1, wherein the false detection storer deletes false detection information that is not updated for a preset period of time from the false detection information.

7. The object detection system of claim 1,
wherein the feedback receiver is configured to receive an object detection result detected by the object detector for a preset period of time, and to store the object detection result corresponding to a false detection as the false detection information in the false detection store.

8. The object detection system of claim 7, wherein the input image does not include an object to be detected.

9. The object detection system of claim 7, wherein the false detection storer comprises a false detection unit, the object detector comprises an object detecting unit, the feedback receiver comprises a feedback receiving unit, and the display comprises a display unit.

10. The object detection system of claim 1, wherein the input image is obtained by an imaging apparatus installed at a fixed position.

11. An object detection method comprising the steps of:
detecting an object from an input image;
comparing object detection information corresponding to the detected object with one or more items of false detection information stored in a memory;
outputting a notification corresponding to the object detection information when false detection information corresponding to the object detection information does not exist;
receiving a user response to the notification; and
when a detection error response to the notification is received, storing the object detection information corresponding to the notification as false detection information in the memory,
wherein when the false detection information corresponding to the object detection information of the detected object is stored in the memory, the notification is not output.

12. The object detection method of claim 11, wherein the object detection information comprises coordinate information corresponding to a location of the object and image information of pixels corresponding to the object; wherein the false detection information comprises coordinate information corresponding to a location of the object and image information of pixels corresponding to the object.

13. The object detection method of claim 12, wherein the comparing step comprises determining a location similarity between the coordinate information of the object detection information and coordinate information of the false detection information, and when the location similarity is equal to or greater than a preset value, determining an image similarity between the image information of the object detection information and image information of the false detection information, and when the image similarity is equal to or greater than a preset value, not outputting the notification.

14. The object detection method of claim 13, wherein when the coordinate information and the image information of the false detection information are determined to be similar to the coordinate information and the image information of the object detection information, the object detection method further comprises the step of updating the coordinate information and the image information of the false detection information to the coordinate information and the image information of the object detection information.

15. The object detection method of claim 13, wherein each of the object detection information and the false detection information further comprises time information at which the object is detected,
wherein the comparing step comprises comparing the time information of the object detection information of the detected object with the time information of the false detection information.

16. The object detection method of claim 11, further comprising the step of deleting false detection information that is not updated for a preset period of time from the false detection information stored in the memory.

17. The object detection method of claim 11,
wherein the receiving step comprises receiving an object detection result detected for a preset period of time, and storing the object detection result corresponding to a false detection as the false detection information in the memory.

18. The object detection method of claim 17, wherein the input image does not include an object to be detected.

19. The object detection method of claim 11, wherein the input image is generated by an imaging apparatus installed at a fixed position.

20. An object detection system comprising:
at least one processor configured to execute computer-readable instructions,
wherein the at least one processor is configured to:
store one or more items of false detection information;
detect an object from an input image, compare object detection information corresponding to the object with false detection information, and output a notification corresponding to the object detection information when false detection information corresponding to the object detection information does not exist;
receive a user response to the notification and, when a detection error response to the notification is received, store the object detection information corresponding to the notification as one false detection information, and not output the notification when the object corresponding to false detection information is detected.

* * * * *